(12) United States Patent
Kojima et al.

(10) Patent No.: US 11,378,670 B2
(45) Date of Patent: Jul. 5, 2022

(54) ULTRASONIC DEVICE AND ULTRASONIC APPARATUS

(71) Applicant: SEIKO EPSON CORPORATION, Tokyo (JP)

(72) Inventors: Chikara Kojima, Matsumoto (JP); Koji Ohashi, Matsumoto (JP); Hironori Suzuki, Chino (JP); Tomohide Onogi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 116 days.

(21) Appl. No.: 16/690,527

(22) Filed: Nov. 21, 2019

(65) Prior Publication Data
US 2020/0166618 A1    May 28, 2020

(30) Foreign Application Priority Data
Nov. 22, 2018    (JP) ............................. JP2018-218978

(51) Int. Cl.
*G01S 7/521*    (2006.01)
(52) U.S. Cl.
CPC ................................... *G01S 7/521* (2013.01)
(58) Field of Classification Search
None
See application file for complete search history.

(56) References Cited

U.S. PATENT DOCUMENTS

| | | | | |
|---|---|---|---|---|
| 8,183,067 B2 * | 5/2012 | Yamazaki | ........... | H01L 27/1214 438/29 |
| 10,016,788 B2 * | 7/2018 | Kato | ..................... | B06B 1/0207 |
| 2002/0073781 A1 * | 6/2002 | Hashimoto | .......... | G01N 29/348 73/641 |
| 2005/0015009 A1 * | 1/2005 | Mourad | ............... | A61B 5/7267 600/438 |
| 2005/0203409 A1 * | 9/2005 | Frey | ...................... | B06B 1/0292 600/459 |
| 2007/0040477 A1 | 2/2007 | Sugiura et al. | | |
| 2008/0013405 A1 * | 1/2008 | Moon | ................... | G01S 15/102 367/92 |

(Continued)

FOREIGN PATENT DOCUMENTS

| | | |
|---|---|---|
| JP | 2006-094459 A | 4/2006 |
| JP | 2018-110360 A | 7/2018 |

*Primary Examiner* — Isam A Alsomiri
*Assistant Examiner* — Vikas Atmakuri
(74) *Attorney, Agent, or Firm* — Oliff PLC

(57) ABSTRACT

An ultrasonic device includes nine ultrasonic array units arranged in a grid pattern of three rows and three columns, nine drive bypass wires that input and output drive signals to and from the respective ultrasonic array units, a first common bypass wire to which a common potential is applied, coupled to the eight ultrasonic array units, a second common bypass wire coupled to the ultrasonic array unit to which the first common bypass wire is not coupled, and a third common bypass wire coupling the first and the second common bypass wires. One of the drive bypass wires, the first common bypass wire, and the second common bypass wire is placed between the ultrasonic array units placed adjacent to each other. The third common bypass wire is placed inside of the ultrasonic array unit placed adjacent to the ultrasonic array unit coupled to the second common bypass wire.

7 Claims, 7 Drawing Sheets

(56) References Cited

U.S. PATENT DOCUMENTS

| | | | |
|---|---|---|---|
| 2008/0116462 A1* | 5/2008 | Suzuki | H01L 27/0248 257/72 |
| 2008/0194053 A1* | 8/2008 | Huang | B06B 1/0292 438/53 |
| 2008/0200812 A1* | 8/2008 | Osawa | B06B 1/0633 600/459 |
| 2010/0109166 A1* | 5/2010 | Cok | H01L 27/3255 257/776 |
| 2011/0234964 A1* | 9/2011 | Moriwaki | G02F 1/136204 349/149 |
| 2012/0266682 A1* | 10/2012 | Torashima | B06B 1/0292 73/715 |
| 2013/0294202 A1* | 11/2013 | Hajati | G01S 15/8952 367/138 |
| 2014/0007693 A1* | 1/2014 | Torashima | B06B 1/0292 73/658 |
| 2014/0049504 A1* | 2/2014 | Cok | G06F 3/0412 345/174 |
| 2014/0116139 A1* | 5/2014 | Endo | A61B 8/4494 73/584 |
| 2014/0241112 A1* | 8/2014 | Kano | H01L 41/09 367/7 |
| 2014/0241113 A1* | 8/2014 | Matsuda | G01S 15/02 367/7 |
| 2015/0087991 A1* | 3/2015 | Chen | G01S 7/52033 600/459 |
| 2015/0092514 A1* | 4/2015 | Kiyose | G01S 7/52017 367/7 |
| 2015/0094590 A1* | 4/2015 | Kiyose | H01L 27/20 600/447 |
| 2015/0265245 A1* | 9/2015 | von Ramm | B06B 1/0625 600/443 |
| 2017/0124703 A1* | 5/2017 | Masuda | G01S 15/8997 |
| 2018/0033853 A1* | 2/2018 | Bower | H01L 27/156 |
| 2018/0132824 A1* | 5/2018 | Tsuruno | A61B 8/4444 |
| 2018/0192995 A1 | 7/2018 | Osawa et al. | |

* cited by examiner

ULTRASONIC DEVICE AND ULTRASONIC APPARATUS

The present application is based on, and claims priority from JP Application Serial Number 2018-218978, filed Nov. 22, 2018, the disclosure of which is hereby incorporated by reference herein in its entirety.

BACKGROUND

1. Technical Field

The present disclosure relates to an ultrasonic device and ultrasonic apparatus.

2. Related Art

In related art, ultrasonic sensors in which transmitting and receiving elements that transmit and receive ultrasonic waves are arranged in grid patterns are known (for example, see JP-A-2006-094459).

In an ultrasonic sensor (ultrasonic device) of JP-A-2006-094459, nine receiving elements are arranged in a grid pattern of three rows and three columns and drive signal wires and common wires are coupled to the respective receiving elements. Thereby, the individual receiving elements can independently receive ultrasonic waves.

However, in the ultrasonic device of JP-A-2006-094459, the drive signal wires and the common wires coupled to the respective receiving elements are sterically arranged by wire bonding. Accordingly, the size of the ultrasonic sensor is increased. To downsize the ultrasonic sensor, it is preferable to two-dimensionally arrange wires for the respective receiving elements on a substrate on which the receiving elements are provided. However, for example, if the spaces between the respective receiving elements are increased with the intension to place pluralities of wires between the respective receiving elements, characteristics of the respective receiving elements fluctuate. Further, if the wires are placed without increase in the spaces between the respective receiving elements, it is difficult to two-dimensionally arrange these wires because the drive signal wires and the common wires are entangled. It is conceivable that the drive signal wires and the common wires are crossed for wiring, however, in this case, it is necessary to insulate the individual wires for preventing short circuit of drive signals or the like and there is a problem that the manufacture of the ultrasonic sensor becomes complex.

SUMMARY

An ultrasonic device according to one application example of the present disclosure includes nine ultrasonic array units arranged in a grid pattern of three rows and three columns, pluralities of ultrasonic transducers arranged in two-dimensional array forms in the respective ultrasonic array units, nine drive bypass wires that input and output drive signals to and from the respective ultrasonic array units, a first common bypass wire to which a common potential is applied, coupled to eight of the ultrasonic array units of the nine ultrasonic array units, a second common bypass wire coupled to the ultrasonic array unit to which the first common bypass wire is not coupled, and a third common bypass wire coupling the first common bypass wire and the second common bypass wire, wherein one of the drive bypass wires, the first common bypass wire, and the second common bypass wire is placed between the ultrasonic array units placed adjacent to each other, and the third common bypass wire is placed inside of the ultrasonic array unit placed adjacent to the ultrasonic array unit coupled to the second common bypass wire.

In the ultrasonic device according to the application example, in the ultrasonic array unit, the plurality of ultrasonic transducers may be arranged at the same spaces, and, in the ultrasonic array units placed adjacent to each other, a space between the ultrasonic transducer in one ultrasonic array unit placed at an end portion at the other ultrasonic array unit side and the ultrasonic transducer in the other ultrasonic array unit placed at an end portion at the one ultrasonic array unit side may be the same as the space between the ultrasonic transducers arranged within the ultrasonic array units.

In the ultrasonic device according to the application example, the third common bypass wire may be placed from one end portion to the other end portion of the ultrasonic array unit in which the third common bypass wire is placed.

An ultrasonic apparatus according to one application example of the present disclosure includes the ultrasonic device of the above described application example, and a drive circuit that inputs drive signals to the ultrasonic transducers.

DESCRIPTION OF EXEMPLARY EMBODIMENTS

Figure 1:
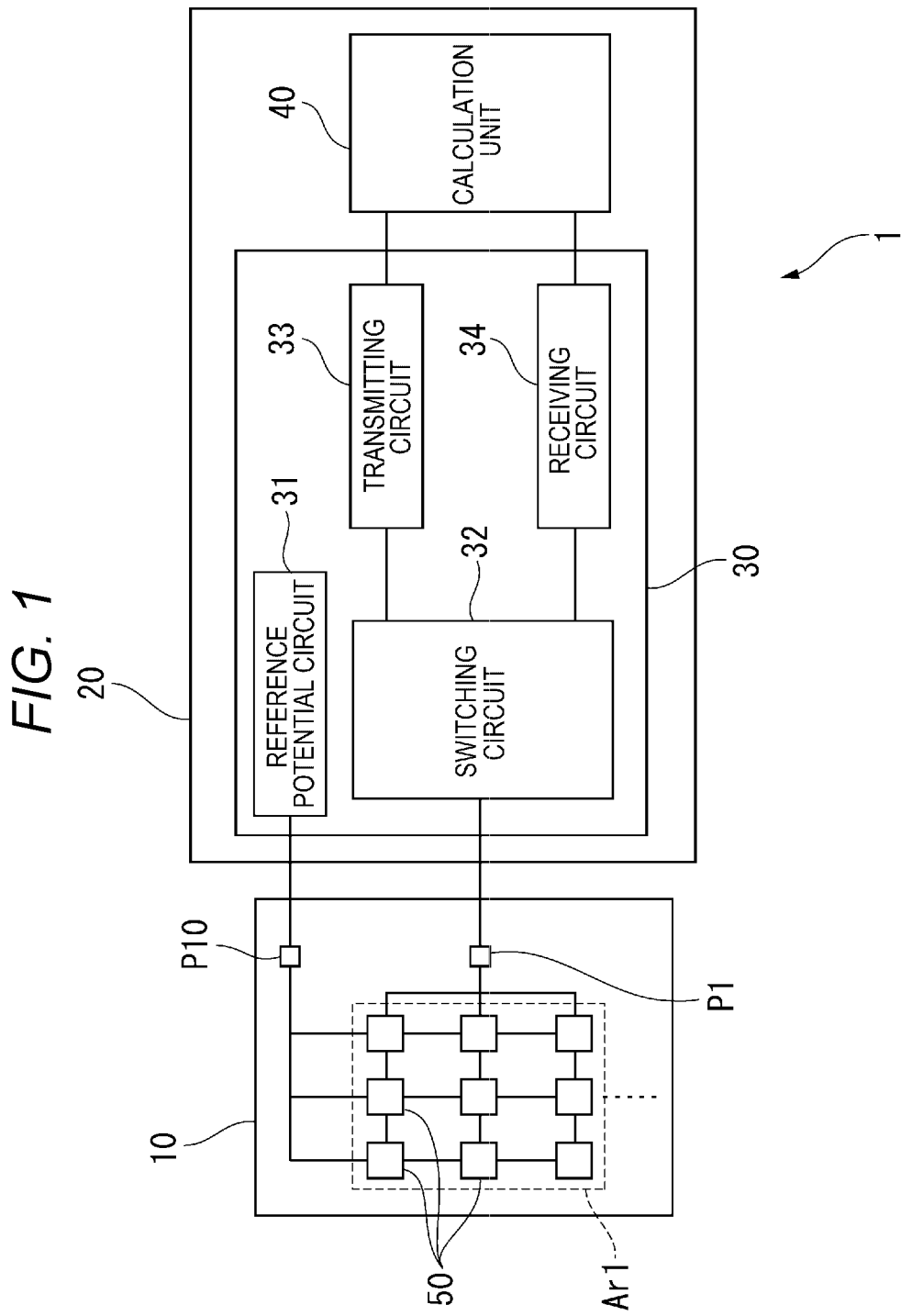
FIG. 1 is a block diagram showing a schematic configuration of a distance measuring apparatus as an example of an ultrasonic apparatus of one embodiment.

FIG. 1 is the block diagram showing the schematic configuration of the distance measuring apparatus 1 as the example of the ultrasonic apparatus of one embodiment.

As shown in FIG. 1, the distance measuring apparatus 1 of the embodiment includes an ultrasonic device 10 and a control unit 20 that controls the ultrasonic device 10. In the distance measuring apparatus 1, the control unit 20 controls the ultrasonic device 10 via a drive circuit 30 and transmits ultrasonic waves from the ultrasonic device 10. Then, when the ultrasonic waves are reflected by an object and reflected waves are received by the ultrasonic device 10, the control unit 20 calculates a distance from the ultrasonic device 10 to the object based on a time from the transmission time of the ultrasonic waves to the reception time of the ultrasonic waves.

As below, a configuration of the distance measuring apparatus 1 will be specifically explained.

Configuration of Ultrasonic Device 10

Figure 2:
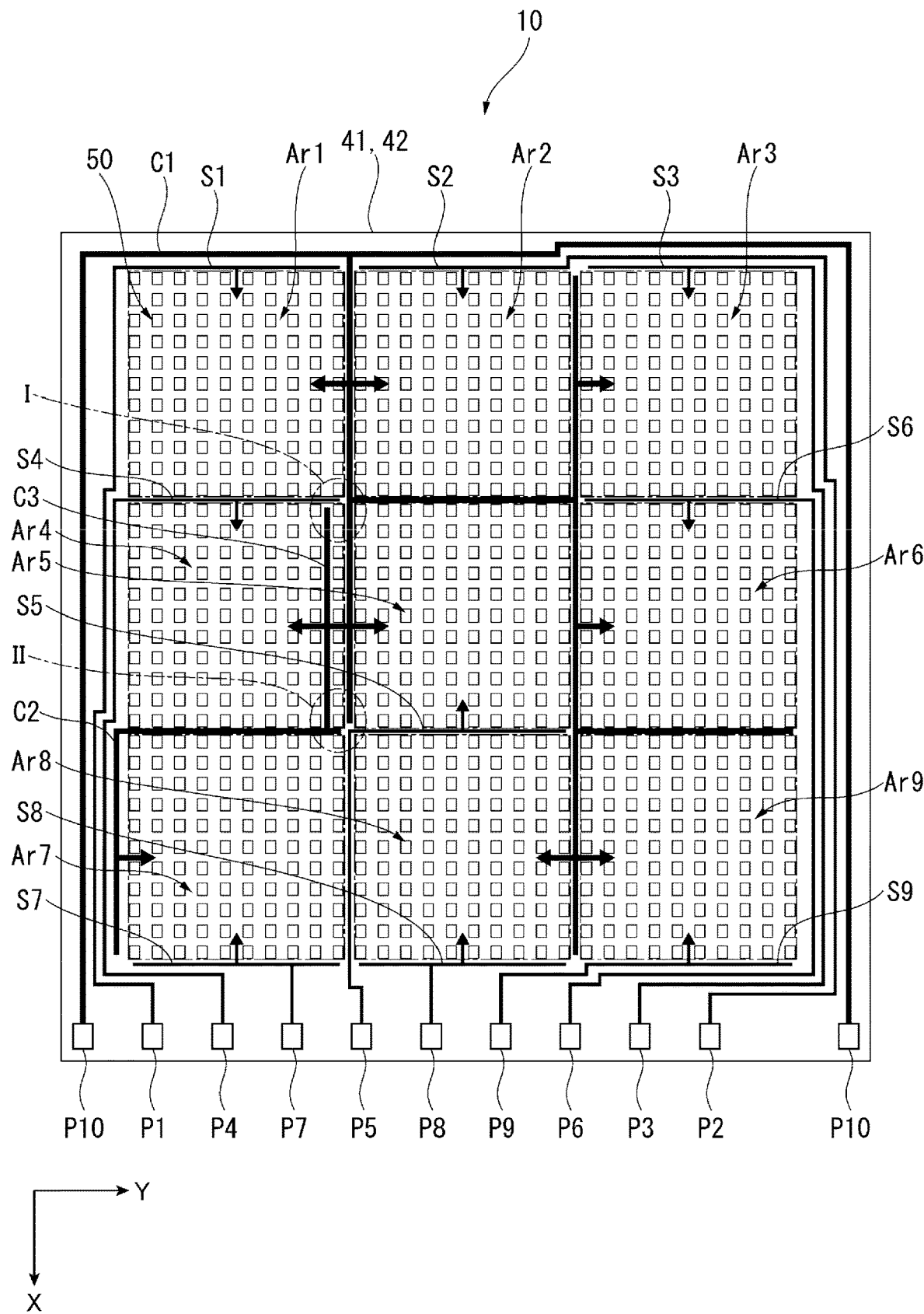
FIG. 2 is a plan view schematically showing a configuration of an ultrasonic device of one embodiment.

FIG. 2 is the plan view schematically showing an overview of the ultrasonic device 10.

As shown in FIG. 2, in the ultrasonic device 10, nine ultrasonic array units Ar are arranged in a grid pattern of three rows and three columns along an X direction and a Y direction crossing each other. Note that, in the embodiment, the case where the individual ultrasonic array units Ar are arranged on the single ultrasonic device 10 is exemplified. The details of the configuration of the ultrasonic device 10 will be described later.

In the embodiment, regarding the arrangement of the ultrasonic array units Ar, in the following description, the arrangement in the Y direction in FIG. 2 is referred to as "row" and the arrangement in the X direction in FIG. 2 is referred to as "column". Further, the position of the ultrasonic array unit Ar on the upper left in FIG. 2 is referred to as [1st row, 1st column]. That is, in the first row, the first ultrasonic array unit Ar1 is placed in the position of [1st row, 1st column], the second ultrasonic array unit Ar2 is placed in the position of [1st row, 2nd column], and the third ultrasonic array unit Ar3 is placed in the position of [1st row, 3rd column]. Similarly, in the second row, the fourth ultrasonic array unit Ar4 is placed in the position of [2nd row, 1st column], the fifth ultrasonic array unit Ar5 is placed in the position of [2nd row, 2nd column], and the sixth ultrasonic array unit Ar6 is placed in the position of [2nd row, 3rd column]. Further, in the third row, the seventh ultrasonic array unit Ar7 is placed in the position of [3rd row, 1st column], the eighth ultrasonic array unit Ar8 is placed in the position of [3rd row, 2nd column], and the ninth ultrasonic array unit Ar9 is placed in the position of [3rd row, 3rd column].

Ultrasonic Array Units Ar

In each of the ultrasonic array units Ar1 to Ar9, ultrasonic transducers 50 are arranged in a two-dimensional array form in the X direction and the Y direction.

In the embodiment, the ultrasonic transducers 50 arranged in each of the ultrasonic array units Ar1 to Ar9 are coupled in parallel. That is, each of the ultrasonic array units Ar1 to Ar9 forms a single channel of transmitting and receiving element group, and thereby, nine channels of transmitting and receiving element groups are formed in the ultrasonic device 10. The details of coupling of the ultrasonic transducers 50 will be described later.

Further, in FIG. 2, for convenience of explanation, the number of arranged ultrasonic transducers 50 is reduced, however, actually, more ultrasonic transducers 50 are arranged.

Drive Bypass Wires S

Drive bypass wires S for inputting drive signals output from the drive circuit 30 to the ultrasonic transducers 50 or inputting drive signals output from the ultrasonic transducers 50 to the drive circuit 30 are respectively coupled to each of the ultrasonic array units Ar1 to Ar9. The drive bypass wires S have first to ninth drive bypass wires S1 to S9 corresponding to the ultrasonic array units Ar1 to Ar9, respectively. The drive bypass wires S1 to S9 are placed between the ultrasonic array units Ar arranged adjacent to each other or along an outer periphery of a device substrate 41, and coupled to corresponding first to ninth drive electrode pads P1 to P9, respectively. Note that, in FIG. 2, the respective drive bypass wires S1 to S9 are shown by thin lines.

Specifically, the first drive bypass wire S1 is placed along the outer periphery at the −Y side and the outer periphery at the −X side of the device substrate 41.

The second drive bypass wire S2 is placed along the outer periphery at the +Y side and the outer periphery at the −X side of the device substrate 41.

The third drive bypass wire S3 is placed along the outer periphery at the +Y side and the outer periphery at the −X side of the device substrate 41.

The fourth drive bypass wire S4 is placed along the outer periphery at the −Y side of the device substrate 41 and between the first ultrasonic array unit Ar1 and the fourth ultrasonic array unit Ar4.

The fifth drive bypass wire S5 is placed along between the seventh ultrasonic array unit Ar7 and the eighth ultrasonic array unit Ar8 and between the fifth ultrasonic array unit Ar5 and the eighth ultrasonic array unit Ar8.

The sixth drive bypass wire S6 is placed along the outer periphery at the +Y side of the device substrate 41 and between the third ultrasonic array unit Ar3 and the sixth ultrasonic array unit Ar6.

The seventh drive bypass wire S7 is placed along the outer periphery at the +X side of the device substrate 41.

The eighth drive bypass wire S8 is placed along the outer periphery at the +X side of the device substrate 41.

The ninth drive bypass wire S9 is placed along the outer periphery at the +X side of the device substrate 41.

Further, the drive electrode pads P1 to P9 are placed near the outer periphery at the +X side of the device substrate 41, and each coupled to the drive circuit 30 of the control unit 20. Thereby, drive signals can be input to and output from the respective ultrasonic array units Ar1 to Ar9 via the respective drive electrode pads P1 to P9 and the respective drive bypass wires S1 to S9.

First Common Bypass Wire C1 and Second Common Bypass Wire C2

A first common bypass wire C1 or a second common bypass wire C2 is coupled to each of the ultrasonic array units Ar1 to Ar9. In the embodiment, the second common bypass wire C2 is coupled to the seventh ultrasonic array unit Ar7 placed at [3rd row, 1st column] and the first common bypass wire C1 is coupled to the other ultrasonic array units Ar. That is, of the nine ultrasonic array units Ar, the first common bypass wire C1 is coupled to the eight ultrasonic array units and the second common bypass wire C2 is coupled to the seventh ultrasonic array unit Ar7 not coupled to the first common bypass wire C1.

The first common bypass wire C1 and the second common bypass wire C2 are placed in positions on the periphery of the device substrate 41 or between the ultrasonic array units Ar placed adjacent to each other in which the drive bypass wires S1 to S9 are not placed. Note that, in FIG. 2, the first common bypass wire C1 and the second common bypass wire C2 are shown by thick lines.

Specifically, the first common bypass wire C1 is placed along the outer periphery at the −X side and the ±Y sides of the device substrate 41. Further, the first common bypass wire C1 is placed along between the first ultrasonic array unit Ar1 and the second ultrasonic array unit Ar2, between the second ultrasonic array unit Ar2 and the fifth ultrasonic array unit Ar5, and between the second ultrasonic array unit Ar2 and the third ultrasonic array unit Ar3. Furthermore, the first common bypass wire C1 is placed along between the fourth ultrasonic array unit Ar4 and the fifth ultrasonic array unit Ar5, between the fifth ultrasonic array unit Ar5 and the sixth ultrasonic array unit Ar6, between the sixth ultrasonic array unit Ar6 and the ninth ultrasonic array unit Ar9, and between the eighth ultrasonic array unit Ar8 and the ninth ultrasonic array unit Ar9.

The first common bypass wire C1 is coupled to a common electrode pad P10 and coupled to the drive circuit 30 of the control unit 20 via the common electrode pad P10, and a common potential of e.g. −3 V is applied thereto.

The second common bypass wire C2 is placed along the outer periphery at the −Y side of the device substrate 41 and between the fourth ultrasonic array unit Ar4 and the seventh ultrasonic array unit Ar7.

As described above, in the embodiment, one of the drive bypass wires S1 to S9, the first common bypass wire C1, and the second common bypass wire C2 is placed between the ultrasonic array units Ar1 to Ar9 placed adjacent to each other.

Third Common Bypass Wire C3

The third common bypass wire C3 is a wire electrically coupling the first common bypass wire C1 and the second common bypass wire C2. In the embodiment, the third common bypass wire C3 is placed inside of the fourth ultrasonic array unit Ar4 placed adjacent to the seventh ultrasonic array unit Ar7 coupled to the second common bypass wire C2. Further, the single third common bypass wire C3 is placed from an end portion at the +X side to an end portion at the −X side within the fourth ultrasonic array unit Ar4.

Furthermore, in the embodiment, the third common bypass wire C3 is placed between the ultrasonic transducers 50 placed in an end portion at the +Y side and the ultrasonic transducers 50 placed in the second positions from the end portion at the +Y side within the fourth ultrasonic array unit Ar4.

In FIG. 2, the third common bypass wire C3 is shown by a thick line.

Details of Configuration of Ultrasonic Device 10

Figure 3:
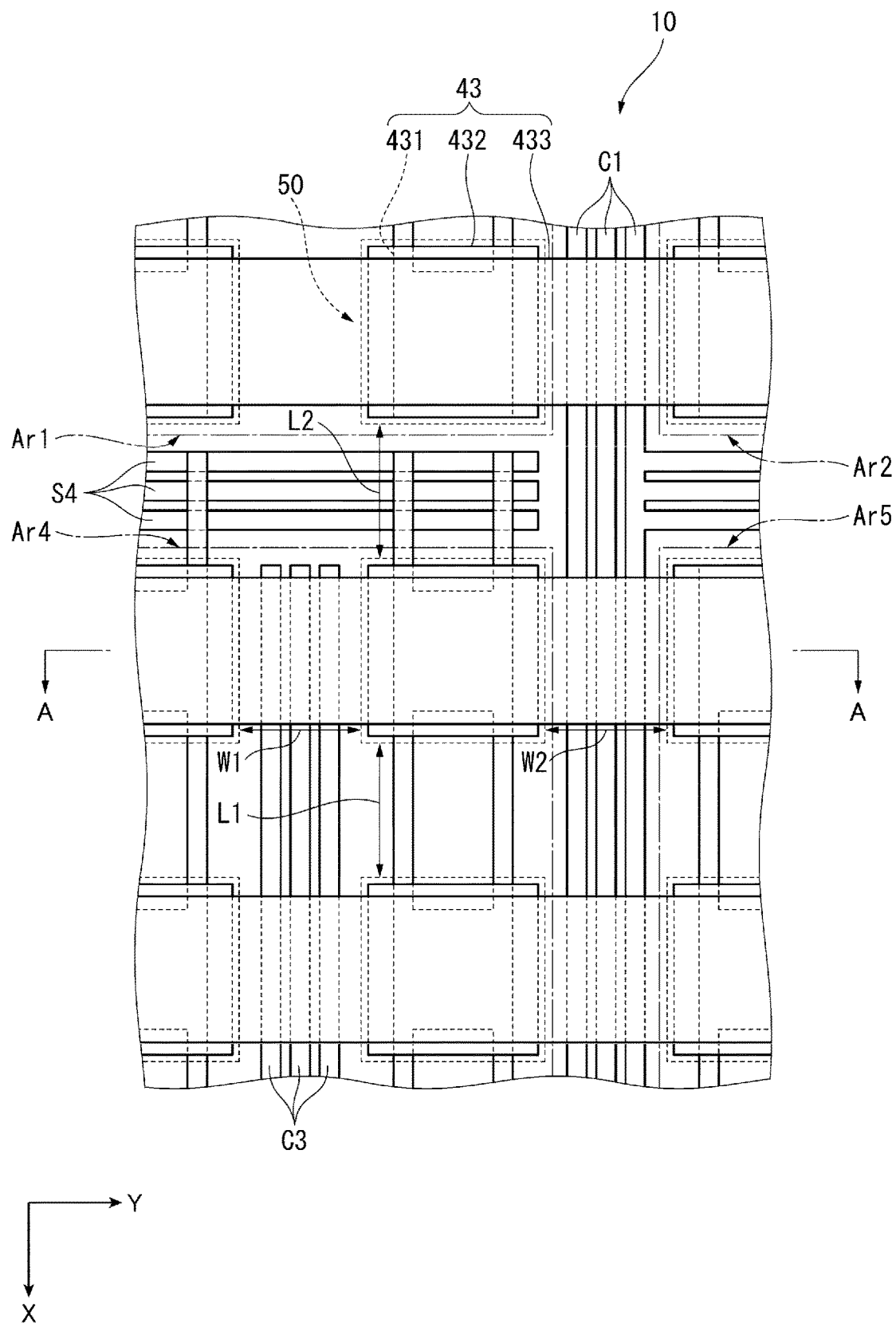
FIG. 3 is a plan view schematically showing the ultrasonic device enlarged in area I in FIG. 2.
Figure 4:
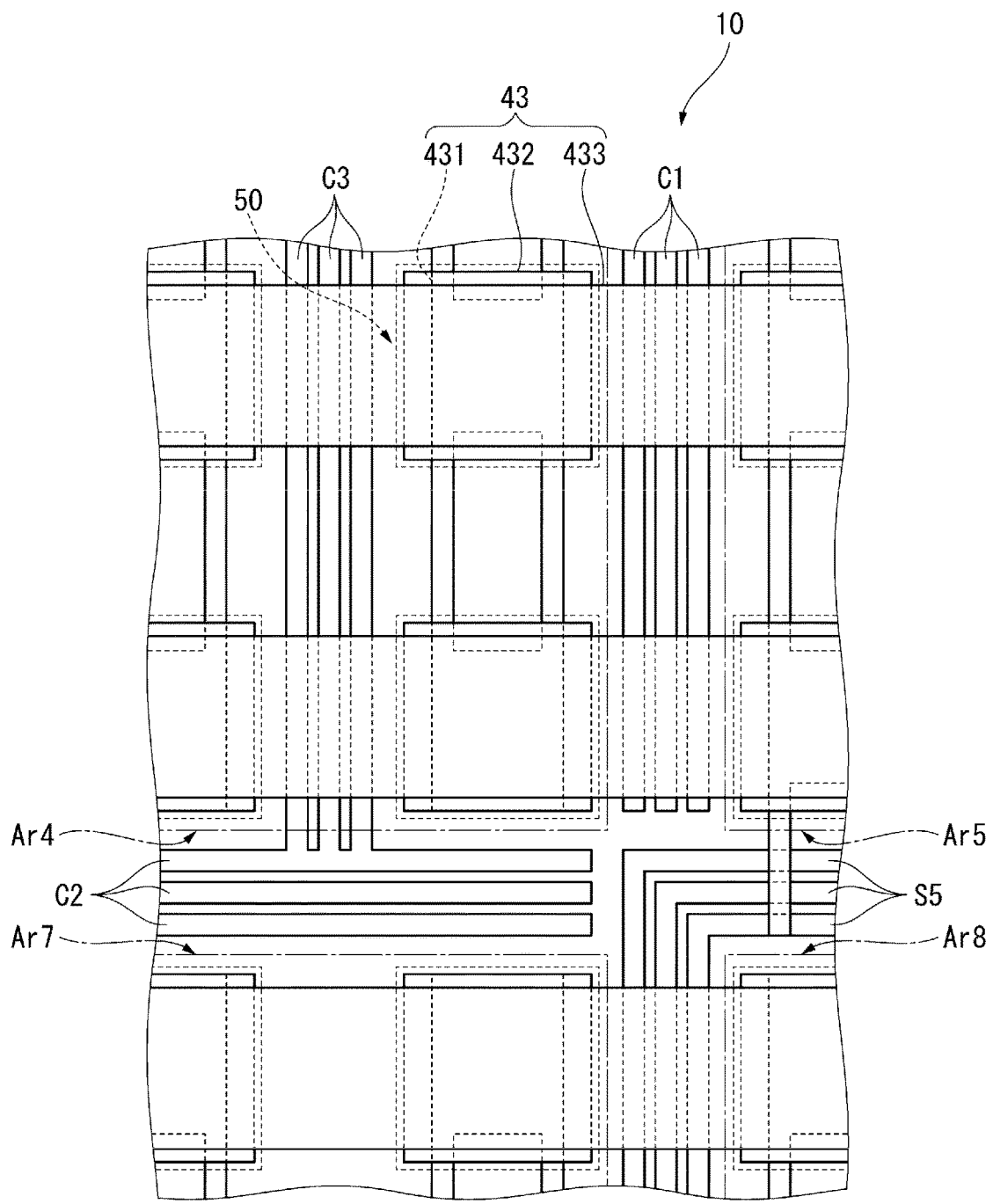
FIG. 4 is a plan view schematically showing the ultrasonic device enlarged in area II in FIG. 2.
Figure 5:
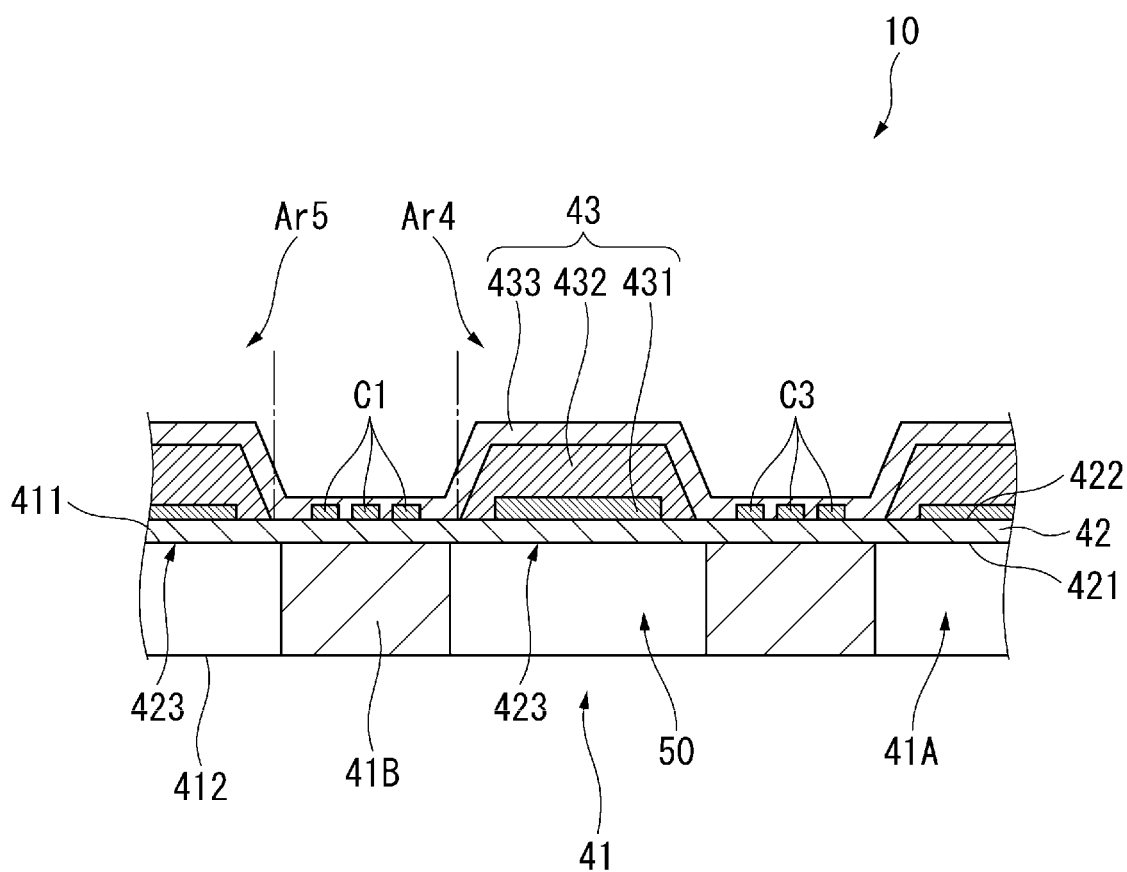
FIG. 5 is a sectional view schematically showing the ultrasonic device cut along line A-A in FIG. 3.

FIG. 3 is the plan view schematically showing the ultrasonic device 10 enlarged in area I in FIG. 2, FIG. 4 is the plan view schematically showing the ultrasonic device enlarged in area II in FIG. 2, and FIG. 5 is the sectional view schematically showing the ultrasonic device cut along line A-A in FIG. 3.

As shown in FIGS. 3 to 5, the ultrasonic device 10 includes the device substrate 41, a support film 42, and piezoelectric elements 43.

Configuration of Device Substrate 41

The device substrate 41 has a first surface 411 and a second surface 412 having a front-back relation with the first surface 411 and is formed using e.g. a semiconductor substrate of Si or the like. Opening portions 41A corresponding to the respective ultrasonic transducers 50 are provided in the device substrate 41. In the embodiment, the opening portions 41A are through holes penetrating from the first surface 411 to the second surface 412 of the device substrate 41, and the support film 42 is provided at the first surface 411 sides of the through holes. Here, portions joined to the support film 42 of the device substrate 41 are partition walls 41B, and the opening portion 41A is surrounded on four sides at the ±X sides and the ±Y sides by the partition walls 41B. That is, the partition walls 41B located at the ±X sides of the opening portion 41A face each other with the opening portion 41A in between and the partition walls 41B located at the ±Y sides of the opening portion 41A face each other with the opening portion 41A in between. Note that the opening portions 41A may be filled with a resin or the like and vibration suppression layers may be formed to suppress the influence by crosstalk.

Configuration of Support Film 42

The support film 42 is formed using e.g. a stacking structure of $SiO_2$ and $ZrO_2$ or the like, and has a third surface 421 facing the opening portions 41A of the device substrate 41 and a fourth surface 422 as a back surface of the third surface 421. That is, the support film 42 is supported by the partition walls 41B forming the opening portions 41A and close the first surface 411 sides of the opening portions 41A. The thickness dimension of the support film 42 is a sufficiently small thickness dimension relative to the device substrate 41.

Here, of the support film 42, parts closing the opening portions 41A form vibrating portions 423 and the vibrating portion 423 and the piezoelectric element 43 form the single ultrasonic transducer 50.

Piezoelectric Element

The piezoelectric elements 43 are provided on the respective vibrating portions 423 at the fourth surface 422 side of the support film 42. The piezoelectric element 43 is formed by e.g. a stacking structure in which a lower electrode 431, a piezoelectric film 432, and an upper electrode 433 are stacked from the support film 42 side.

In the ultrasonic transducer 50, when a rectangular voltage having a predetermined frequency, i.e., a drive signal is applied between the lower electrode 431 and the upper electrode 433, the piezoelectric film 432 flexes, the vibrating portion 423 vibrates, and ultrasonic waves are transmitted. Further, when the vibrating portion 423 is vibrated by ultrasonic waves reflected by a test object, a potential difference is generated between the upside and the downside of the piezoelectric film 432. Thereby, the potential difference generated between the lower electrode 431 and the upper electrode 433 is detected and the received ultrasonic waves can be detected.

As shown in FIGS. 3 and 4, in the embodiment, a plurality of the lower electrodes 431 are linearly formed along the X direction and arranged along the Y direction within each of the ultrasonic array units Ar1 to Ar9. The respective lower electrodes 431 are coupled to the corresponding drive bypass wires S1 to S9. That is, the lower electrodes 431 are coupled in parallel via the corresponding drive bypass wires S1 to S9 within the respective ultrasonic array units Ar1 to Ar9. For example, in FIG. 4, the lower electrodes 431 placed within the fourth ultrasonic array unit Ar4 are coupled to the fourth drive bypass wire S4 in the end portion at the −X side and coupled in parallel via the fourth drive bypass wire S4. Further, the lower electrodes 431 are electrically coupled to a switching circuit 32, which will be described later, via the drive bypass wires S1 to S9 and the drive electrode pads P1 to P9 corresponding to the respective ultrasonic array units Ar1 to Ar9.

Note that the drive bypass wires S1 to S9 are each formed as bundles of wires in which pluralities of wires are bundled. In the embodiment, each of the drive bypass wires S1 to S9 is formed by a bundle of three wires.

A plurality of the upper electrodes 433 are linearly formed along the Y direction and arranged along the X direction within each of the ultrasonic array units Ar1 to Ar9. The upper electrodes 433 are each coupled to the first common bypass wire C1 or the second common bypass wire C2. That is, the upper electrodes 433 are coupled in parallel via the first common bypass wire C1 and the second common bypass wire C2 within the respective ultrasonic array units Ar1 to Ar9. For example, in FIG. 3, the upper electrodes 433 placed within the fourth ultrasonic array unit Ar4 are coupled to the first common bypass wire C1 in the end portion at the +Y side and coupled in parallel via the first common bypass wire C1. Further, the upper electrodes 433 are electrically coupled to a referential potential circuit 31, which will be described later, via the first common bypass wire C1, the second common bypass wire C2, the third common bypass wire C3, and the common electrode pad P10.

Note that the first common bypass wire C1 and the second common bypass wire C2 are formed as bundles of wires in which pluralities of wires are bundled. In the embodiment, the first common bypass wire C1 and the second common bypass wire C2 are formed by bundles of three wires.

Arrangement of Ultrasonic Transducers 50

As shown in FIG. 3, in the embodiment, the plurality of ultrasonic transducers 50 are arranged at the same spaces within each of the ultrasonic array units Ar1 to Arg. Specifically, the individual ultrasonic transducers 50 are arranged at L1 spaces along the X direction and arranged at W1 spaces along the Y direction. Note that the arrangement at the same spaces is not limited to the arrangement at completely the same spaces, but includes the arrangement at substantially the same spaces.

Further, in the first ultrasonic array unit Ar1 and the fourth ultrasonic array unit Ar4 arranged adjacent to each other in the X direction, a space L2 between the ultrasonic transducer 50 placed in the end portion at the +X side of the first ultrasonic array unit Ar1 and the ultrasonic transducer 50 placed in the end portion at the −X side of the fourth ultrasonic array unit Ar4 is the same as the above described L1.

Similarly, in the fourth ultrasonic array unit Ar4 and the fifth ultrasonic array unit Ar5 arranged adjacent to each other in the Y direction, a space W2 between the ultrasonic transducer 50 placed in the end portion at the +Y side of the fourth ultrasonic array unit Ar4 and the ultrasonic transducer 50 placed in the end portion at the −Y side of the fifth ultrasonic array unit Ar5 is the same as the above described W1. Note that "the same" is not limited to "completely the same", but includes "substantially the same".

That is, in the ultrasonic array units Ar placed adjacent to each other, the space between the ultrasonic transducer 50 in one ultrasonic array unit Ar placed in the end portion at the other ultrasonic array unit Ar side and the ultrasonic transducer 50 in the other ultrasonic array unit Ar placed in the end portion at the one ultrasonic array unit Ar side is the same as the space between the ultrasonic transducers 50 arranged within the ultrasonic array units Ar.

Note that, in the embodiment, the ultrasonic transducers 50 are further arranged at the same spaces in the X direction and the Y direction. That is, L1, L2, W1, and W2 are the same.

Coupling between First Common Bypass Wire C1 and Third Common Bypass Wire C3

As shown in FIGS. 3 and 5, as described above, the first common bypass wire C1 is placed between the fourth ultrasonic array unit Ar4 and the fifth ultrasonic array unit Ar5.

Further, the third common bypass wire C3 is placed between the piezoelectric element 43 placed in the end portion in the +Y direction and the second piezoelectric element 43 from the end portion in the +Y direction in the fourth ultrasonic array unit Ar4. In the embodiment, like the first common bypass wire C1, the third common bypass wire C3 is formed as a bundle of wires in which three wires are bundled.

The first common bypass wire C1 and the third common bypass wire C3 are electrically coupled via the upper electrodes 433 linearly formed along the Y direction.

Coupling Between Second Common Bypass Wire C2 and Third Common Bypass Wire C3

As shown in FIG. 4, as described above, the second common bypass wire C2 is placed between the fourth ultrasonic array unit Ar4 and the seventh ultrasonic array unit Ar7. Further, the second common bypass wire C2 and the third common bypass wire C3 are coupled in the end portion at the +X side of the fourth ultrasonic array unit Ar4.

Thereby, the first common bypass wire C1 and the second common bypass wire C2 are electrically coupled via the third common bypass wire C3.

Configuration of Control Unit 20

Returning to FIG. 1, the control unit 20 includes the drive circuit 30 that drives the ultrasonic device 10 and a calculation unit 40. Further, in addition, a memory unit that stores various kinds of data, various programs, etc. for control of the distance measuring apparatus 1 may be provided in the control unit 20.

The drive circuit 30 is a driver circuit for controlling driving of the ultrasonic device 10, and includes e.g. the reference potential circuit 31, the switching circuit 32, a transmitting circuit 33, and a receiving circuit 34 as shown in FIG. 1.

The reference potential circuit 31 is coupled to the common electrode pad P10 of the ultrasonic device 10 and applies a reference potential e.g. −3 V or the like to the upper electrodes 433 of each of the ultrasonic array units Ar1 to Ar9 via the first common bypass wire C1, the second common bypass wire C2, and the third common bypass wire C3.

The switching circuit 32 is coupled to the respective drive electrode pads P1 to P9, the transmitting circuit 33, and the receiving circuit 34. The switching circuit 32 includes a switching circuit and switches between transmission coupling for coupling the respective drive electrode pads P1 to P9 and the transmitting circuit 33, and reception coupling for coupling the respective drive electrode pads P1 to P9 and the receiving circuit 34.

The transmitting circuit 33 is coupled to the switching circuit 32 and the calculation unit 40 and, when the switching circuit 32 is switched to the transmission coupling, outputs drive signals in pulse waveforms to the ultrasonic transducers 50 within the respective ultrasonic array units Ar1 to Ar9 and transmits ultrasonic waves from the ultrasonic device 10 based on the control of the calculation unit 40.

Functions and Effects of Embodiment

The ultrasonic device 10 of the embodiment includes the respective nine ultrasonic array units Ar1 to Ar9 having the pluralities of piezoelectric elements 43 arranged in the two-dimensional array forms and arranged in the grid pattern of three rows and three columns. The drive bypass wires S1 to S9 that input and output the drive signals are coupled to the ultrasonic array units Ar1 to Ar9, respectively. Further, the first common bypass wire C1 to which the common potential is applied is coupled to the eight ultrasonic array units Ar except the seventh ultrasonic array unit Ar7, and the second common bypass wire C2 is coupled to the seventh ultrasonic array unit Ar7.

In this regard, one of the drive bypass wires S1 to S9, the first common bypass wire C1, and the second common bypass wire C2 is placed between the individual ultrasonic array units Ar1 to Ar9 placed adjacent to each other. Further, the first common bypass wire C1 and the second common bypass wire C2 are electrically coupled by the third common bypass wire C3, and the third common bypass wire C3 is placed inside of the sixth ultrasonic array unit Ar6.

Thereby, the respective drive bypass wires S1 to S9 that input and output the drive signals to and from the respective piezoelectric elements 43 and the first common bypass wire C1 and the second common bypass wire C2 that apply common potentials may be two-dimensionally arranged between the respective ultrasonic array units Ar1 to Ar9 and along the outer peripheries of the respective ultrasonic array units Ar1 to Ar9. Accordingly, the ultrasonic device 10 may be downsized.

Furthermore, it is not necessary to place the drive bypass wires S1 to S9, the first common bypass wire C1, the second common bypass wire C2, and the third common bypass wire C3 to cross. Accordingly, short circuit may not occur among the drive bypass wires S1 to S9, the first common bypass wire C1, the second common bypass wire C2, and the third common bypass wire C3, and it is not necessary to insulate these wires. Therefore, the manufacture of the ultrasonic device 10 may be made easier.

In the embodiment, the ultrasonic array units Ar1 to Ar9 are each arranged in the grid pattern of three rows and three columns. Accordingly, for example, when the fifth ultrasonic array unit Ar5 placed at the center is used as a unit for transmission and the ultrasonic array units Ar arranged around the unit are used as units for reception, the reflected waves of the ultrasonic waves transmitted from the fifth ultrasonic array unit Ar5 as the unit for transmission may be homogeneously received by the other ultrasonic array units Ar. Therefore, the reception characteristics of the individual ultrasonic array units Ar as the units for reception may be homogenized and performance as the ultrasonic device 10 may be improved.

In the embodiment, in each of the ultrasonic array units Ar1 to Arg, the ultrasonic transducers 50 are arranged at equal spaces. Specifically, the ultrasonic transducers 50 are arranged at the L1 spaces along the X direction and arranged at the W1 spaces along the Y direction. Further, for example, in the first ultrasonic array unit Ar1 and the fourth ultrasonic array unit Ar4 arranged adjacent to each other in the X direction, the space L2 between the ultrasonic transducer 50 placed in the end portion at the +X side of the first ultrasonic array unit Ar1 and the ultrasonic transducer 50 placed in the end portion at the −X side of the fourth ultrasonic array unit Ar4 is the same as the above described L1. Similarly, in the first ultrasonic array unit Ar and the second ultrasonic array unit Ar2 arranged adjacent to each other in the Y direction, the space W2 between the ultrasonic transducer 50 placed in the end portion at the +Y side of the fourth ultrasonic array unit Ar4 and the ultrasonic transducer 50 placed in the end portion at the −Y side of the fifth ultrasonic array unit Ar5 is the same as the above described W1. That is, in the ultrasonic device 10, the ultrasonic transducers 50 are arranged at the same spaces along the X direction and the Y direction.

Here, for example, when the spaces between the ultrasonic array units Ar are increased for placement of the two wires of the drive bypass wire S and the first common bypass wire C1 between the ultrasonic array units Ar1 to Arg placed adjacent to each other, the spaces at which the ultrasonic transducers 50 are arranged become inhomogeneous. When the spaces at which the ultrasonic transducers 50 are arranged become inhomogeneous, uneven multireflection occurs and the influence by the so-called crosstalk becomes noticeable. Then, a specific frequency of the ultrasonic waves transmitted by the ultrasonic transducers 50 may be cancelled and it may be impossible to obtain desired vibration characteristics.

On the other hand, in the embodiment, the ultrasonic transducers 50 are arranged at the same spaces along the X direction and the Y direction, and uneven multireflection may be suppressed. Accordingly, desired vibration characteristics may be easily obtained.

In the embodiment, the third common bypass wire C3 is placed from the end portion at the +X side to the end portion at the −X side within the fourth ultrasonic array unit Ar4. Thereby, the wire is coupled to the first common bypass wire C1 via the plurality of upper electrodes 433 arranged in the X direction, and thus, resistance may be made smaller in the coupling between the first common bypass wire C1 and the third common bypass wire C3. Accordingly, a voltage drop of the reference potential may be made smaller from the first common bypass wire C1 to the third common bypass wire C3.

Modified Examples

The present disclosure is not limited to the above described respective embodiments, and the present disclosure includes modifications and improvements within the range in which the purpose of the present disclosure may be achieved and configurations obtained by appropriate combinations of the respective embodiments or the like.

In the above described embodiment, the example in which the third common bypass wire C3 is placed within the fourth ultrasonic array unit Ar4 is shown, however, the configuration is not limited to that.

Figure 6:
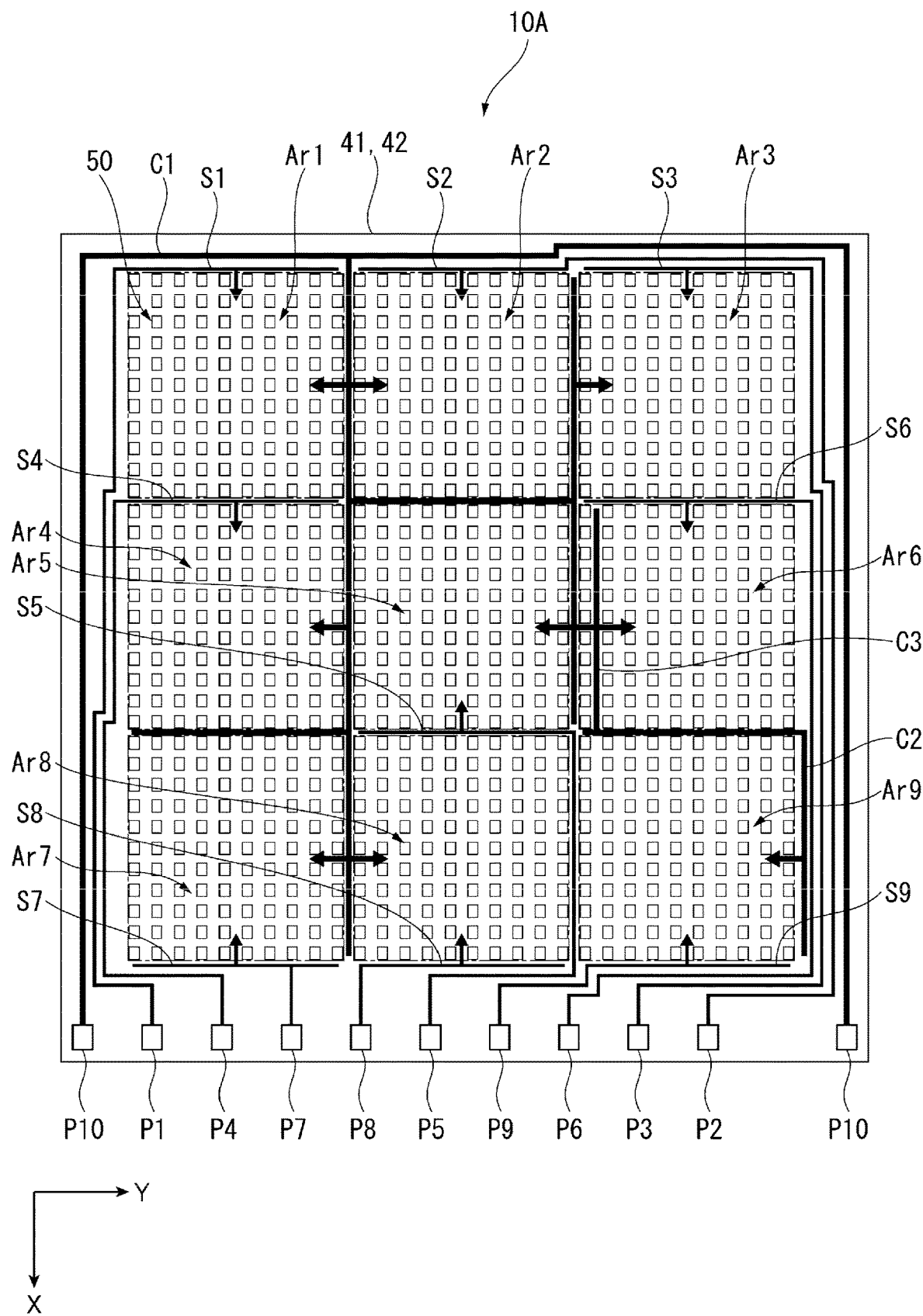
FIG. 6 is a plan view schematically showing a configuration of an ultrasonic device of a modified example.

FIG. 6 is the plan view schematically showing the configuration of an ultrasonic device 10A of a modified example.

As shown in FIG. 6, the third common bypass wire C3 may be placed within the sixth ultrasonic array unit Ar6. In this case, the second common bypass wire C2 may be coupled to the ninth ultrasonic array unit Arg.

Figure 7:
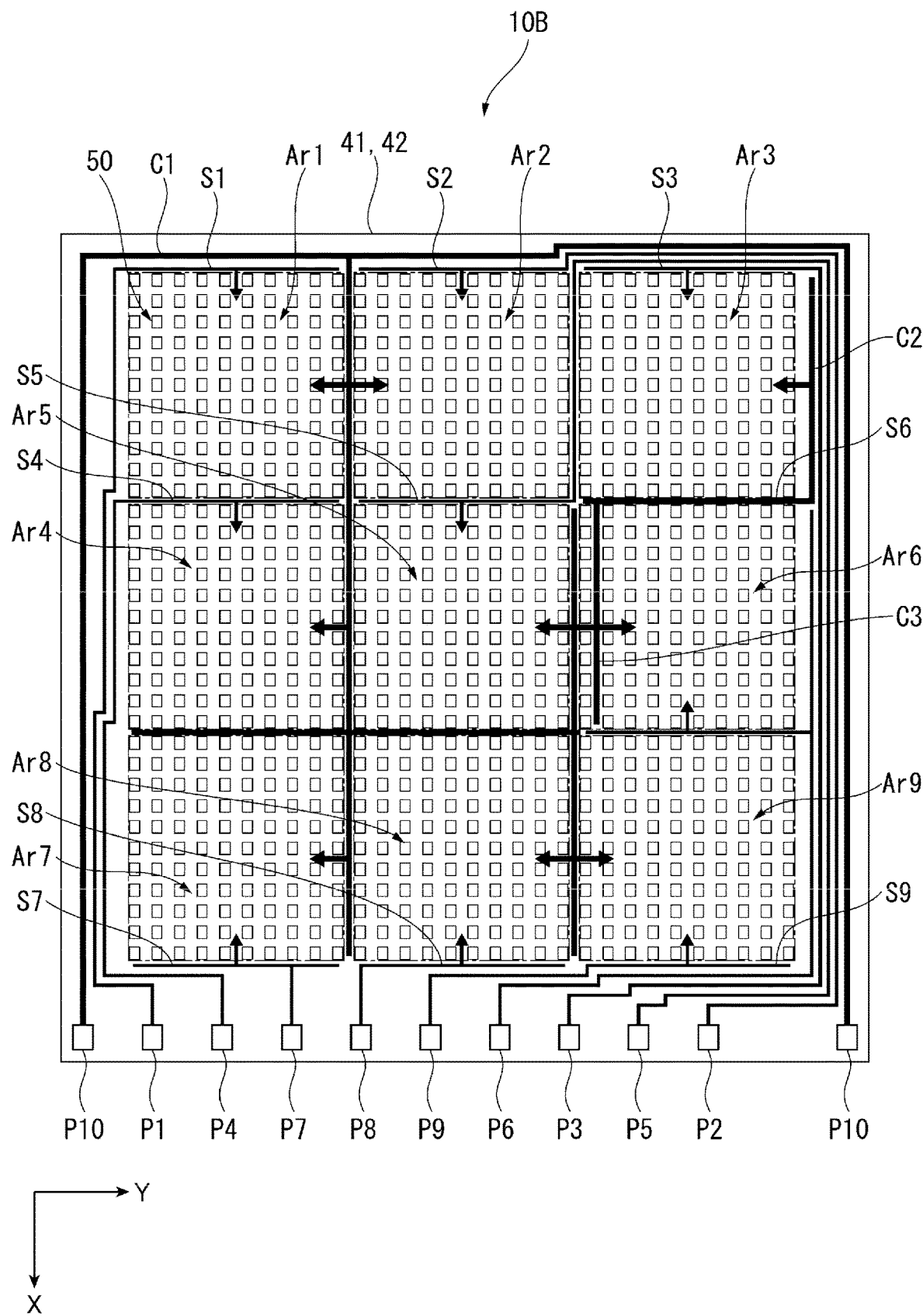
FIG. 7 is a plan view schematically showing a configuration of an ultrasonic device of another modified example.

Further, FIG. 7 is the plan view schematically showing the configuration of an ultrasonic device 10B of another modified example.

As shown in FIG. 7, the third common bypass wire C3 may be placed within the sixth ultrasonic array unit Ar6 and the second common bypass wire C2 may be coupled to the third ultrasonic array unit Ar3.

In the above described embodiment, the example in which the third common bypass wire C3 is placed from the end portion at the +X side to the end portion at the −X side within the fourth ultrasonic array unit Ar4 is shown, however, the configuration is not limited to that. For example, the third common bypass wire C3 may be placed over apart in the X direction within the fourth ultrasonic array unit Ar4 as long as the wire is coupled to the upper electrodes 433 arranged in the end portion at the +X side and the second common bypass wire C2.

Further, in the above described embodiment, the example in which the third common bypass wire C3 is placed between the ultrasonic transducers 50 placed in the end portion at the +Y side and the ultrasonic transducers 50 placed in the second positions from the end portion at the +Y side within the fourth ultrasonic array unit Ar4 is shown, however, the configuration is not limited to that. For example, the third common bypass wire C3 may be placed between the ultrasonic transducers 50 placed in the end portion at the −Y side and the ultrasonic transducers 50 placed in the second positions from the end portion at the −Y side within the fourth ultrasonic array unit Ar4 as long as the wire is placed between the ultrasonic transducers 50 placed adjacent to each other.

Furthermore, in the above described embodiment, the example in which the single third common bypass wire C3 is placed within the fourth ultrasonic array unit Ar4 is shown, however, a plurality of the wires may be placed therein.

In the above described embodiment, the example in which the piezoelectric elements 43 are provided at the fourth surface 422 side of the support film 42 is shown, however, the configuration is not limited to that. For example, the piezoelectric elements 43 may be provided at the third surface 421 side of the support film 42.

In the above described embodiment, a sealing plate may be joined to the fourth surface 422 side of the support film 42 via a beam portion.

In this case, the vibrating portion 423 may be partitioned by the partition walls 41B and the beam portion.

In the above described embodiment, the distance measuring apparatus 1 is exemplified as an example of an ultrasonic apparatus, however, the apparatus is not limited to that. For example, the ultrasonic apparatus may be applied to an ultrasonic measuring apparatus that measures inner cross-sectional images of a structure according to transmission and reception results of ultrasonic waves or the like.

In addition, a specific structure when the present disclosure is embodied may be configured by an appropriate combination of the above described embodiments and modified examples within a range in which the purpose of the present disclosure may be achieved, or may be appropriately changed to another structure.

What is claimed is:

1. An ultrasonic device comprising:
   nine ultrasonic array units arranged in a grid pattern of three rows and three columns, the grid pattern being rectangular;
   pluralities of ultrasonic transducers arranged in two-dimensional array forms in the respective ultrasonic array units so that the ultrasonic array units are rectangular;
   nine drive wires that input and output drive signals to and from the respective ultrasonic array units;
   a first section of common wire to which a common potential is applied, coupled to eight of the ultrasonic array units of the nine ultrasonic array units;
   a second section of common wire coupled to the ultrasonic array unit to which the first section of common wire is not coupled; and
   a third section of common wire coupling the first section of common wire and the section of second common wire, wherein
   one of the drive wires, the first section of common wire, and the second section of common wire is between and parallel to a side of each of the ultrasonic array units that are adjacent to each other in each of the three rows,
   one of the drive wires, the first section of common wire, and the second section of common wire is between and parallel to a side of each of the ultrasonic array units that are adjacent to each other in each of the three columns, and
   the third section of common wire is inside of the ultrasonic array unit adjacent to the ultrasonic array unit coupled to the second section of common wire.

2. The ultrasonic device according to claim 1, wherein all adjacent ultrasonic transducers of the pluralities of ultrasonic transducers are equally spaced apart both within each respective one of the ultrasonic array units and between adjacent ones of the ultrasonic array units.

3. The ultrasonic device according to claim 1, wherein the third section of common wire extends from one end portion to the other end portion of the ultrasonic array unit in which the third section of common wire is placed.

4. An ultrasonic apparatus comprising:
   the ultrasonic device according to claim 1; and
   a drive circuit that inputs drive signals to the ultrasonic transducers.

5. The ultrasonic device according to claim 1, wherein the drive wires, the first section of common wire, the second section of common wire and the third section of common wire are coplanar.

6. The ultrasonic device according to claim 5, wherein the second section of common wire is between the ultrasonic array unit adjacent to the ultrasonic array unit coupled to the second section of common wire and the ultrasonic array unit coupled to the second section of common wire.

7. The ultrasonic device according to claim 6, wherein the second section of common wire and the third section of common wire are coupled in an end portion of the ultrasonic array unit adjacent to the ultrasonic array unit coupled to the second section of common wire at a side where the ultrasonic array unit coupled to the second section of common wire is.

* * * * *